United States Patent [19]

Mouri et al.

[11] Patent Number: 5,690,922
[45] Date of Patent: Nov. 25, 1997

US005690922A

[54] DEODORIZABLE FIBERS AND METHOD OF PRODUCING THE SAME

[75] Inventors: Motoya Mouri, Suita; Hiroyuki Koyou, Warabi; Tatsuro Takeuchi, Moriyama; Kenji Hiramatsu, Osaka, all of Japan

[73] Assignee: Takeda Chemical Industries, Ltd., Osaka, Japan

[21] Appl. No.: 601,588

[22] Filed: Feb. 14, 1996

[30] Foreign Application Priority Data

Feb. 15, 1995 [JP] Japan ................................. 7-051693

[51] Int. Cl.$^6$ ....................................................... A61K 7/00
[52] U.S. Cl. ........................ 424/76.1; 424/76.3; 424/402
[58] Field of Search ........................... 424/47, 76.1, 76.3, 424/402; 514/945; 428/357, 364, 372, 373, 374, 379, 397, 399

[56] References Cited

U.S. PATENT DOCUMENTS

| | | | |
|---|---|---|---|
| 4,784,909 | 11/1988 | Emi et al. | 428/357 |
| 4,988,505 | 1/1991 | Watanabe et al. | 424/76.3 |
| 5,049,159 | 9/1991 | Yamaji et al. | 8/125 |
| 5,183,656 | 2/1993 | Uesaka et al. | 424/76.1 |
| 5,547,823 | 8/1996 | Murasawa et al. | 430/531 |

FOREIGN PATENT DOCUMENTS

| | | |
|---|---|---|
| 0 325 133 | 7/1989 | European Pat. Off. . |
| 62-6985 | 1/1987 | Japan . |
| 62-6986 | 1/1987 | Japan . |
| 63-295711 | 12/1988 | Japan . |
| 2-80611 | 3/1990 | Japan . |
| 2-91209 | 3/1990 | Japan . |
| 5-504091 | 7/1993 | Japan . |
| 6-47276 | 2/1994 | Japan . |

OTHER PUBLICATIONS

Teijin Ltd., Database WPI, Section Ch, Week 8437. Derwent Publications Ltd., London GB AN94–300283 JP-A-06228823.

*Primary Examiner*—Thurman K. Page
*Assistant Examiner*—Kathryne E. Shelborne
*Attorney, Agent, or Firm*—Wenderoth, Lind & Ponack

[57] ABSTRACT

A fiber is incorporated with a titanium oxide or other photocatalyst and an adsorbent comprising a phosphate of a tetravalent metal and a hydroxide of a divalent metal. The amounts of the photocatalyst and the adsorbent based on the total amount of the fiber are, about 0.1 to 25% by weight and about 0.1 to 25% by weight, respectively. The fiber may have a composite structure such as sheath-core structure in which the concentration of the photocatalyst in the sheath is higher than that of the core, and may be a fiber having a modified cross section.

19 Claims, No Drawings

DEODORIZABLE FIBERS AND METHOD OF PRODUCING THE SAME

FIELD OF THE INVENTION

This invention relates to deodorizable fibers which are useful for rapid decomposition, removal and deodorization of malodorous components and harmful components derived from a tobacco, sweat or a building material, typically speaking, and a method of producing the same.

BACKGROUND OF THE INVENTION

There has recently been paid more attention to various malodors in daily environments of homes, offices, hospitals and other instruments. Such malodorous components and harmful components include a variety of compounds such as ammonia, amines (e.g. trimethylamine, triethylamine, etc.) and other nitrogen-containing compounds, hydrogen sulfide, methylmercaptan and other sulfur-containing compounds, formaldehyde, acetaldehyde and other aldehydes, formic acid, acetic acid, propionic acid, valeric acid and other lower fatty acids and the like.

As described above, there are a variety of malodorous components including lower fatty acids and other acidic malodorous components, nitrogen-containing compounds and other basic malodorous components, and sulfur-containing compounds, aldehydes and other neutral malodorous components in the daily environments. It is difficult, however, to remove or eliminate a plurality of components varying in the species effectively.

For removing these substances, various deodorizable fibers including, for example, a deodorant fiber comprising a fiber and an adsorbent supported on the fiber have been proposed. In such deodorant fiber, however, the adsorption capacity of the adsorbent has a certain limit so that when the adsorption quantity of malodorous components amounts to a saturated adsorption capacity, deodorization of malodorous components can not be achieved. Japanese Patent Application Laid-open Nos. 6985/1987 (JP-A-62-6985) and 6986/1987 (JP-A-62-6986) disclose catalytic decomposition of malodorous components by means of a deodorant fiber supporting a metallic phthalocyanine. However, the catalytic activity of the metallic phthalocyanine is so small that sufficient deodorizing effects can not be obtained.

Japanese Patent Application Laid-open No. 295711/1988 (JP-A-63-295711) proposes a deodorant fiber comprising a fiber and zirconium phosphate kneaded or compounded into the fiber as a deodorant component. Japanese Patent Application Laid-open No. 91209/1990 (JP-A-2-91209) proposes a deodorant fiber as produced by kneading or compounding a zinc silicate particle which comprises a zinc oxide and silicic dioxide and which has an amorphous structure into a fiber, and Japanese Patent Application Laid-open No. 80611/1990 (JP-A-2-80611) proposes a deodorant fiber as produced by kneading a white fine powder of a hydrated oxide of titanium and zinc into a fiber.

Further, Japanese Patent Application Laid-open No. 504091/1993 (JP-A-5-504091) and Japanese Patent Application Laid-open No. 47276/1994 (JP-A-6-47276) disclose deodorant fibers produced by compounding or incorporating an adsorbable composition containing a water-insoluble phosphate of a tetravalent metal and a hydroxide of a divalent metal into a fiber.

These deodorant fibers, however, do not insure excellent deodorizing capabilities for all species of malodorous components including acidic malodorous components, basic malodorous components and neutral malodorous components.

SUMMARY OF THE INVENTION

It is, therefore, an object of the present invention to provide a deodorizable fiber which insures efficient elimination (removal) of a variety of malodorous components over a long duration of time, and a method of producing such fiber.

It is another object of this invention to provide a deodorizable fiber having high removing capabilities for not only acidic malodorous components and basic malodorous components but also neutral malodorous components, and a method of producing the same.

A further object of the present invention is to provide a deodorizable fiber which guarantees efficient elimination of malodorous components irrespective of exposure to light irradiations or not, and a method of producing such fiber.

Another object of the invention is to provide a deodorizable fiber whereby malodorous components can be eliminated effectively without sacrificing the characteristics of the fiber, and a production method thereof.

It is a still further object of the present invention to provide a fibrous article having such excellent characteristics as mentioned above.

The inventors of the present invention made intensive investigations to accomplish the above-mentioned objects, and have found that incorporation of a deodorizable composition comprising a specific phosphate and hydroxide together with a photocatalyst having a photocatalytic activity into a fiber results in removal of various malodorous components, and maintenance of elimination capabilities for malodorous components over a long time. The present invention has been accomplished on the basis of the above findings.

Thus, the deodorizable fiber of the present invention is a fiber comprising a phosphate of a tetravalent metal, a hydroxide of a divalent metal and a photocatalyst. The photocatalyst may include a photo-semiconductor, for example, an oxide-semiconductor such as a titanium oxide. The content of the photocatalyst may be about 0.1 to 25% by weight and the proportion of the deodorizable component may be about 0.1 to 25% by weight, respectively based on the total weight of the fiber. In the deodorizable component, the relative proportion of the photocatalyst to 100 parts by weight of the total amount of the phosphate of the tetravalent metal and the hydroxide of the divalent metal may be about 10 to 750 parts by weight.

The deodorizable fiber may have a variety of structures, such as a composite or complex structure comprising a phase containing a deodorizable component in a high concentration and a phase in which the concentration of the deodorizable component is lower than that of the above mentioned high-concentration phase (e.g. a sheath-core structure, a side-by-side structure, etc.). Further, the deodorizable fiber may be a fiber having a modified cross section, such as a hollow-shape.

The deodorizable fiber may be obtained by incorporating the deodorizable component into a fiber. As means to incorporate the deodorizable component into a fiber, there may be mentioned, for example, a process which comprises allowing a fiber to support the deodorizable component on its surface, a process which comprises spinning a resin composition comprising the deodorizable component and a fiber-formable resin to give a fiber containing the deodorant component therein.

It should be understood that the term "incorporation" as used in this specification generically means and includes the incorporation of the deodorizable composition into a fiber by spinning and supporting as mentioned above, otherwise particularly specified. The Group numbers of the Periodic Table of Elements as indicated in this specification are in accordance with the Nomenclature Rule (1970) of the Inorganic Chemistry Nomenclature Commission of International Union of Pure and Applied Chemistry (IUPAC). Further, a composition comprising the phosphate of the tetravalent metal and the hydroxide of the divalent metal may occasionally be referred to as "adsorbent (adsorbing agent)", and this "adsorbent" and other adsorbing agent may briefly be referred to as "adsorbable component". The term "deodorizable component" as used in this specification may simply mean and include a composition comprising the photocatalyst, the adsorbent, and where necessary, other deodorizing agent, otherwise particularly specified. Moreover, a composition comprising the deodorizable component, if necessary together with an antimicrobial component may occasionally be referred to as "deodorizable composition", generically speaking.

DETAILED DESCRIPTION OF THE INVENTION

The fiber incorporating the deodorizable component may be any species of fibers including a synthetic fiber, a semi-synthetic fiber, a regenerated fiber and a naturally-occurring fiber.

Examples of the synthetic fiber includes various fibers obtainable from fiber-formable resins, such as polyester fibers (e.g. poly(ethylene terephthalate) fibers and poly(butylene terephthalate) fibers), polyamide fibers (e.g. nylon 6, nylon 66, nylon 11, nylon 12, nylon 610, nylon 612 and other aliphatic polyamide fibers; allcyclic polyamide fibers; fibers of an aromatic polyamide obtainable by using an aromatic diamine and/or an aromatic dicarboxylic acid or their derivative, such as fibers of an aromatic polyamide including poly(phenylene isophthalamide), poly(hexamethylene terephthalamide) and poly(p-phenylene terephthalamide) and so on), polyolefinic fibers (e.g. fibers of polyethylene, polypropylene, etc.), ethylene-vinyl vinyl alcohol copolymer fibers, poly(vinyl chloride)-series fibers (e.g. fibers of poly(vinyl chloride), a vinyl chloride-vinyl acetate copolymer, a vinyl chloride-acrylonitrile copolymer, etc.), poly(vinylidene chloride)-series fibers (e.g. fibers of a vinylidene chloride-vinyl chloride copolymer, a vinylidene chloride-vinyl acetate copolymer, etc.), polyurethane fibers, acrylic fibers (e.g. acrylonitrile-containing fibers having an acrylonitrile unit such as an acrylonitrile-vinyl chloride copolymer, etc.), vinylon and other poly(vinyl alcohol)-containing fibers, polychlal fibers, fluorine-containing fibers, protein-acrylonitrile copolymer-containing fibers, poly(glycolic acid) fibers, phenolic resin fibers and others.

The semi-synthetic fiber includes acetate fibers, and the regenerated fiber includes rayon and cupra, for instance. As examples of the naturally-occurring fiber, there may be mentioned cotton, wool, silk and hemp. Further, according to a use of the fiber, inorganic fibers such as glass fibers, carbon fibers and metallic fibers may also be employed.

Among these fibers, polyester fibers, polyamide fibers, polyurethane fibers, acrylic fibers, rayon and naturally-occurring fibers may preferably be used.

Such fibers may be used singly or in combination with one or more other fibers of the same or different species, or in the form of a composite fiber comprising a plurality of fibers.

The photocatalyst used in the present invention means and includes a catalyst which plays a role as an photooxidizing catalyst by producing an active oxygen on exposure to light irradiations such as ultraviolet ray irradiations, and hence oxidizing and decomposing a variety of harmful components and malodorous components. Therefore, the photocatalyst may practically belong to the category of an oxidizing photocatalyst. Use of such photocatalyst results in deodorization utilizing not only a mere adsorption activity but also catalytic decomposition so that the deodorizing effect can be maintained over a long period. Further, the photocatalyst has antimicrobial activities and other activities in addition to decomposing activity of harmful or malodorous components.

As the photocatalyst, a variety of photo-semiconductor can be employed regardless of being organic or inorganic substance, but an inorganic photo-semiconductor may practically be used as such photocatalyst. The photocatalyst includes, for instance, sulfide-semiconductor (e.g. CdS, ZnS, $In_2S_3$, PbS, $Cu_2S$, $MoS_3$, $WS_2$, $Sb_3S_3$, $Bi_3S_3$, $ZnCdS_2$, etc.), metallic chalcogenites (CdSe, $In_2Se_3$, $WSe_3$, HgSe, PbSe, CdTe, etc.), oxide-semiconductors ($TiO_2$, ZnO, $WO_3$, CdO, $In_2O_3$, $Ag_2O$, $MnO_2$, $Cu_2O$, $Fe_2O_3$, $V_2O_5$, $SnO_2$, etc.) and so on. Semiconductors such as GaAs, Si, Se, $Cd_2P_3$ and $Zn_2P_3$ may also be included in the scope of the photocatalyst, in addition to the sulfide-semiconductors and oxide-semiconductors. Such photocatalysts may be used singly or in combination.

Preferred photocatalysts among these photocatalysts are CdS, ZnS and other sulfide-semiconductors and $TiO_2$, ZnO, $SnO_2$, $WO_3$ and other oxide-semiconductors. In particular, $TiO_2$, $ZnO_2$ and other oxide-semiconductors can advantageously be employed. There is no particular restriction in a crystal structure of the constituent photo-semiconductor of the photocatalyst. By taking $TiO_2$ as an example, it may have whichever type of crystal structures, such as an anatase-type, a brookite-type, a rutlie-type, an amorphous-type or others. Preferable example of $TiO_2$ includes an anatase-type titanium oxide.

The photocatalyst may be used in the form of a sol or gel, as well as in the form of a powder or granule. When a powdery or granular photocatalyst is chosen, the mean particle size of such photocatalyst can be selected from a range not adversely affecting the photoactivity (activity on exposure to a light irradiation) and deodorizing efficiency, and is for instance about 0.01 to 25 μm, preferably about 0.05 to 10 μm, and more preferably about 0.05 to 5 μm.

The proportion of the photocatalyst may also be selected from a broad range according to the structure of the fiber insofar as not sacrificing the catalytic activity, and is, for instance, about 0.1 to 25% by weight, preferably about 0.3 to 20% by weight (e.g. about 1 to 20% by weight), more preferably about 0.5 to 15% by weight and practically about 0.5 to 10% by weight based on the total amount of the fiber.

In the deodorizable fiber of the present invention, a composition comprising the photocatalyst, the phosphate of the tetravalent metal and the hydroxide of the divalent metal (namely, the deodorizable component) can advantageously be used. Such deodorizable component provides a high catalytic activity and insures efficient elimination (removal) of various compounds such as malodorous components over a prolonged period. Therefore, according to the deodorizable fiber where the photocatalyst and the adsorbent are used in combination, the deodorizing capabilities can remarkably be enhanced. That is, a sole use of the photocatalyst fails to insure effective deodorizing activity under dark conditions.

Further, depending on the species of malodorous components, a decomposed product may occasionally be omitted or left from the catalyst and hence cause a new malodorous problem. In contrast, when a combination of the photocatalyst and the adsorbent is incorporated into a fiber, such a deodorizable fiber can be obtained that insures effective elimination of malodorous components with high efficiency over a long period regardless of the presence or absence of light irradiations.

The Group in the Periodic Table of Elements of the tetravalent metal constituting the phosphate is not particularly restricted only if the metal is a tetravalent metal. The tetravalent metal includes, for example, Group 4 elements of the Periodic Table of Elements such as Group 4A elements (e.g. titanium, zirconium, hafnium, thorium, etc.) and Group 4B elements (e.g. germanium, tin, lead, etc.). Among these metals, metals belonging to Group 4A elements of the Periodic Table of Elements such as titanium, zirconium and hafnium, and Groups 4B elements such as tin are preferably employed. In particular, titanium and zirconium, as well as tin, can advantageously be used.

As the phosphoric acid which constitutes the phosphate, there may be mentioned a variety of phosphoric acids such as orthophosphoric acid, metaphosphoric acid, pyrophosphoric acid, triphosphoric acid, tetraphosphoric acid and so on. The phosphoric acid may practically be orthophosphoric acid, metaphosphoric acid or pyrophosphoric acid. The phosphate (salt of a phosphoric acid) may also include hydrogenphosphates such as hydrogenorthophosphate. Incidentally, the term "phosphoric acid" as used in this specification means orthophosphoric acid, otherwise particularly specified.

These phosphates of the tetravalent metals are usually insoluble or sparsely soluble in water. Further, the phosphates may be crystalline salts, but they may preferably be amorphous salts. These phosphates can be used singly or in combination.

The divalent metal constituting a hydroxide may belong to whichever of Groups of the Periodic Table of Elements only if it is a divalent metal. As examples of the divalent metal, there may be mentioned copper and other Group 1B elements of the Periodic Table of Elements, magnesium, calcium, strontium, barium and other Group 2A elements of the Periodic Table of Elements, zinc, cadmium and other Group 2B elements of the Periodic Table of Elements, chromium, molybdenum and other Group 6A elements of the Periodic Table of Elements, manganese and other Group 7A elements of the Periodic Table of Elements, iron, ruthenium, cobalt, rhodium, nickel, palladium and other Group 8 elements of the Periodic Table of Elements and so on. These hydroxides of divalent metals may be employed independently or in combination.

Preferred examples of the divalent metal include transition metals such as copper and other Group 1B elements of the Periodic Table of Elements, zinc and other Group 2B elements of the Periodic Table of Elements, manganese and other Group 7A elements of the Periodic Table of Elements, and iron, cobalt, nickel and other Group 8 elements of the Periodic Table of Elements. Typically preferred divalent metal includes copper and zinc, as well as iron, cobalt, nickel and so forth.

The hydroxides of these divalent metals are, generally, insoluble or sparsely soluble (poorly soluble) in water in a weakly acidic region through a weakly alkalescent (alkaline) region (e.g. pH 4 through pH 10). The hydroxides may be crystalline salts, but they may preferably be amorphous salts.

The proportion of the hydroxide of the divalent metal relative to the phosphate of the tetravalent metal can be selected from a range not sacrificing the catalytic activities, adsorption capabilities and/or deodorizing capabilities for malodorous components, and is for example such that the metal ratio (divalent metal/tetravalent metal) is about 0.1 to 10, preferably about 0.2 to 7, and more preferably about 0.2 to 5, in terms of atomic metal ratio. When plurality of the phosphates and/or the hydroxides are used in combination, it is enough if the atomic metal ratio based on the total amount of each metal would be within the above-specified range. Further, the composition comprising the phosphate of the tetravalent metal and the hydroxide of the divalent metal may be compounded or combined, for instance, in the form of a gel mixture by means of coprecipitation or other techniques.

In particular, use of a composite obtainable by admixing or coprecipitating the adsorbent comprising the phosphate of the tetravalent metal and the hydroxide of the divalent metal in combination with the photocatalyst provides high catalytic activity and insures efficient elimination of various or diverse compounds such as malodorous components over a long time.

The amount of the adsorbent can be selected from a suitable range according to a structure of the fiber and is, for example, about 0.1 to 25% by weight, preferably about 0.5 to 20% by weight (e.g. about 1 to 20% by weight) and more preferably about 1 to 15% by weight based on the total amount of the fiber. The fiber may practically comprise about 1 to 10% by weight of the adsorbent based on the total amount of the fiber.

The relative proportion of the photocatalyst to 100 parts by weight of the adsorbent is about 1 to 1,000 parts by weight, preferably about 10 to 750 parts by weight and more preferably about 20 to 500 parts by weight.

The deodorizable component may further comprise other adsorbing agent (such other adsorbing agent may simply be referred to as "additional adsorbent"). The additional adsorbent may be whichever of an inorganic adsorbent or organic adsorbent. The additional adsorbent may be a black adsorbent, but a non-black adsorbent, preferably a light colored or pale adsorbent (e.g. a blue adsorbent), a white or colorless adsorbent is practically employed. The inorganic adsorbent includes, for instance, an aluminum oxide (alumina), a silica (silicon dioxide), a copper oxide, an iron oxide, a cobalt oxide, a nickel oxide and other metallic oxides, a silica gel, a silica sol, zeolite and other silicates, montmorillonite, allophane, sepiolite and other clay minerals and so on. The additional adsorbent may be a compounded or complex adsorbent obtainable by coprecipitation of these ingredients.

As the organic adsorbent, there may be mentioned for example a variety of ion exchange resins each having carboxyl group, sulfonic acid group, amino group or other ion exchangeable functional group, organic acid adsorbents each having the above acidic functional group, a porous polyethylene, a porous polypropylene, a porous polystyrene, a porous poly(methyl methacrylate) and other porous resins.

The species of the additional adsorbent may properly be selected corresponding to a use of the fiber, or malodorous components to be treated, and when the fiber is exposed to a high temperature in a production process or when used at a high temperature, an inorganic adsorbent can preferably be employed as the additional adsorbent.

The additional adsorbent can be used singly or in combination and may be compounded with at least one ingredient selected from the group consisting of the photocatalyst, the phosphate of the tetravalent metal and the hydroxide of the divalent metal by means of mixing or coprecipitating, for instance.

The adsorbent comprising the phosphate of the tetravalent metal and the hydroxide of the divalent metal may constitute an adsorbable composition in combination with a silicon dioxide, while such silicon dioxide is useful for increasing the specific surface area and hence for enhancing the adsorption capacity. As the silicon dioxide, there may be mentioned for example an inorganic polymer derived from a silicon dioxide as it is, or an compounded or composite compound such as a compound formed with a silicon dioxide and a phosphate of a tetravalent metal. The silicon dioxide may also be a hydrated silicon dioxide. Such silicon dioxide may be crystalline, but is preferably amorphous.

The content of the silicon dioxide may liberally be selected from a range not interfering with the catalytic activity and adsorbability of the photocatalyst, and relative proportion of the silicon dioxide to the adsorbent is, for instance, such that a ratio of silicon/metals of the adsorbent equals about 0.2 to 10, preferably about 0.5 to 8 and more preferably about 1 to 7, in terms of atomic metal ratio.

The deodorizable component may further comprise, in addition to or in the absence of the additional adsorbent, an antimicrobial metal component (for example, silver, copper, zinc and others), in particular a silver component. A composition containing a silver component among these antimicrobial metal components has a high antimicrobial activity and a broad antimicrobial spectrum.

The silver component may be a metallic silver, or an inorganic compound of silver (for instance, AgCl, AgF, $AgF_2$ and other halides, $Ag_2O$, AgO and other oxides, $Ag_2S$ and other sulfides, $Ag_2SO_4$, $Ag_2CrO_4$, $Ag_3PO_4$, $Ag_2CO_3$, $Ag_2SiO_3$ and other oxo acid salts). The silver component may also be a compound formed with the adsorbable component (e.g. a compound formed with the phosphate of the tetravalent metal and the silver, a compound formed with the hydroxide of the divalent metal and the silver, or a compound formed with the silicon dioxide and the silver). The silver component may be water-soluble, but preferably insoluble or sparsely soluble in water. These silver components may be employed independently or in association.

The silver component can easily or readily be introduced or incorporated into the adsorbable component or deodorizable composition in a conventional manner such as ion-exchanging, coprecipitation and other techniques.

The content of the silver component is, in terms of metallic silver, about 0.1 to 10% by weight, preferably about 0.5 to 8% by weight and more preferably about 0.5 to 7% by weight relative to the total weight of the deodorizable component.

The total amount of the deodorizable composition comprising the deodorizable component, and if necessary the additional adsorbent (e.g. a silicon dioxide) and/or silver component may be selected from a range not sacrificing the characteristics of the fiber, and practically is about 0.1 to 30% by weight, preferably about 0.5 to 25% by weight and more preferably about 1 to 20% by weight based on the total weight of the fiber.

The deodorizable component may preferably be an amorphous composition, in particular a coprecipitated composition formed by coprecipitation. Such amorphous deodorizable component formed by coprecipitation may usually have a BET (Brunauer-Emmett-Teller equation) specific surface area of about 10 to 1,000 $m^2/g$, preferably about 30 to 1,000 $m^2/g$ and more preferably about 50 to 1,000 $m^2/g$. Accordingly, a fiber incorporated with such deodorizable component may not only play a role as an adsorbable fiber having a high adsorption capability but also exhibit activities as a deodorizable fiber for decomposing and/or removing a variety of organic or inorganic compounds including malodorous components.

The deodorizable component and deodorizable composition can be obtained in accordance with various conventional technologies. By way of illustration, the deodorizable component or deodorizable composition may easily be obtained by mixing the phosphate of the tetravalent metal, the hydroxide of the divalent metal and the photocatalyst, where necessary together with the additional adsorbent (e.g. a silicon dioxide) and/or the silver component. In such mixing, each component may be used in the form of a powder or granule obtainable by pulverization or other technique.

The photocatalyst can be prepared according to conventional technologies, for example, a technique comprising forming a water-insoluble precipitate from an aqueous solution containing a metal ion corresponding to the photocatalyst, a technique comprising preparing it from a metallic alkoxide or a gas-phase method which comprises oxidizing a raw material at a high temperature.

In preparation of the photocatalyst, a compound containing an ingredient corresponding to the catalyst may be used. Taking a titanium oxide as an example, such component includes titanium halides such as $TiCl_4$, $TiF_4$, $TiBr_4$, etc.; sulfates such as $Ti(SO_4)_2$ and $TiOSO_4$; titanium $C_{1-6}$ alkoxides such as $(CH_3O)_4Ti$, $(C_2H_5O)_4Ti$, $[CH_3(CH_2)_2O]_4Ti$, $[(CH_3)_2CHO]_4Ti$, $[CH_3(CH_2)_3O]_4Ti$, $[(CH_3)_2CHCH_2O]_4Ti$ and the like. Further, a titanium oxide sol previously prepared may also be employed.

The deodorizable component can also be prepared according to a technique which comprises using a solution containing a tetravalent metal ion, a divalent metal ion and an ingredient corresponding to the photocatalyst, or an aqueous solution containing two or more species of these metal ions to produce a mixture of precipitates of the corresponding water insoluble substances. Such precipitate mixture obtained in the above manner is, usually, in the form of a gel, and drying of the mixture provides a mixture having an amorphous structure. In this technique, the corresponding ingredient to the photocatalyst may preferably be added to an aqueous solution in the form of an adequate crystal structure which has previously been converted.

For preparing an aqueous solution containing a tetravalent metal ion, a divalent metal ion and a silver ion, a variety of water-soluble metallic compounds may be employed. As the water-soluble metallic compounds of the divalent metal, tetravalent metal and silver, there may be mentioned, for example, various metallic salts, metallic alkoxides and so forth. The metallic salt includes acidic salts, oxysalts and other metallic salts in the form of double salts or complex salts, in addition to normal metal salts (normal salts). The metal salt may also be a compound which is insoluble in water where a pH value of the aqueous solution is around neutral region, only if it is soluble in an acidic solution. As practical examples of the metallic salt, there may be mentioned the following compounds.

(1) Metallic halides such as fluorides, chlorides, bromides and iodides:

$CoCl_2$, $NiCl_2$, $CuCl_2$, $ZnCl_2$, $FeF_2$, $FeCl_2$, $FeBr_2$, $FeI_2$, $Na_2(SnF_6)$, $K_2(SnF_6)$, $K_2(SnCl_6)$, $CaCl_2$, $CrCl_2$, $BaCl_2$, $MgCl_2$, $MnCl_2$, $TiCl_4$, $SnCl_4$, $ZrCl_4$, $ThCl_4$, $ThI_4$, $PbCl_4$, $GeCl_4$ and the like.

(2) Sulfates, ammonium sulfates and other salts with sulfuric acid (inorganic acid salts):

$FeSO_4$, $CoSO_4$, $(NH_4)_2Fe(SO_4)_2$, $ZnSO_4$, $CdSO_4$, $Ag_2SO_4$, $CrSO_4$, $CuSO_4$, $NiSO_4$, $MgSO_4$, $MnSO_4$, $K_2Co(SO_4)_2$, $(NH_4)_2Mn(SO_4)_2$, $Zr(SO_4)_2$, $Sn(SO_4)_2$, $Th(SO_4)_2$, $Pb(SO_4)_2$, $Ti(SO_4)_2$, etc.

(3) Nitrates (inorganic acid salts):

$Zn(NO_3)_2$, $Co(NO_3)_2$, $Cd(NO_3)_2$, $Ca(NO_3)_2$, $AgNO_3$, $Fe(NO_3)_2$, $Cu(NO_3)_2$, $Ni(NO_3)_2$, $Ba(NO_3)_2$, $Mn(NO_2)_2$, $Zr(NO_3)_4$, $Ti(NO_3)_4$, $Sn(NO_3)_4$, $Th(NO_3)_4$ and so forth.

(4) Chlorates, perchlorates, thiocyanates, diamminesilver sulfates, diamminesilver nitrates, chromates and other various inorganic acid salts:

$Zn(ClO_3)_2$, $Ca(ClO_3)_2$, $Ag(ClO_3)$, $Ba(ClO_3)_2$, $Ca(ClO_4)_2$, $AgClO_4$, $Fe(ClO_4)_2$, $Ni(ClO_4)_2$, $Ba(ClO_4)_2$, $Mg(ClO_4)_2$, $Co(ClO_4)_2$, $Zn(SCN)_2$, $Ca(SCN)_2$, $CaCrO_4$, $AgCrO_4$, $Ag_2CO_3$ and so on.

(5) Acetates, formates, oxalates and other organic acid salts:

$(CH_3CO_2)_2Zn$, $(CH_3CO_2)_4Zr$, $C_2O_4Co$, $(CH_3CO_2)_2Co$, $(CH_3CO_2)_2Fe$, $(CH_3CO_2)Cu$, $(CH_3CO_2)_2Ni$, $(CH_3CO_2)_2Ba$, $(CH_3CO_2)_2Mg$, $(CH_3CO_2)Ag$, $(C_2O_4)_2Th$, etc.

(6) Oxysalts of metals (oxysalts of metals in the form of halides, inorganic acid salts and organic acid salts):

$ZrOCl_2$, $ZrOSO_4$, $ThOCl_2$, $TiOSO_4$, $ZrO(NO_3)_2$, $ZrOCO_3$, $(NH_4)_2ZrO(CO_3)_2$, $ZrO(CH_3CO_2)_2$ and so forth.

(7) Metallic alkoxides:

$C_{1-6}$ alkoxides such as $Zr(OCH_3)_4$, $Ti(OCH_3)_4$, $Zr(OC_2H_5)_4$, $Ti(OC_2H_5)_4$ and so on.

Among these metallic compounds, inorganic acid salts, in particular strong acid salts such as sulfates and nitrates, may practically be employed. In more detail, $FeSO_4$, $Ti(SO_4)_2$, $ZnSO_4$, $CuSO_4$, $AgNO_3$, $Cu(NO_3)_2$ and the like are frequently be used. As the titanium compound and zirconium compound among these tetravalent metallic compounds, there may practically be employed oxysalts of metals such as $ZrOCl_2$, $ZrOSO_4$, $TiOSO_4$ and the like.

Regarding a water-soluble silicate compound as a supply source of a silicic acid ion for formation of the silicon dioxide, there may be mentioned sodium silicate, potassium silicate and other alkali metal salts of silicic acid, calcium silicate, barium silicate and other alkaline earth metal salts of silicic acid, ammonium silicate and so forth. The silicon dioxide may not necessarily be soluble in water, and a raw material in other form such as a xerogel of a silicon dioxide (silica gel), a hydrosol or hydrogel thereof can also be utilized. As such silicic acid ion source, use is made of, generally, an alkalescent (basic) silicate, preferably an alkali metal salt of silicic acid, a hydrosol or a hydrogel. Sodium silicate can advantageously be used among others for its cost and handling properties.

The phosphate of the tetravalent metal and the hydroxide of the divalent metal may be prepared by producing a hydroxide of a divalent metal in the presence of a phosphate of a tetravalent metal together with an ion of a divalent metal. By way of illustration, they may be prepared by (i) a technique which comprises producing a phosphate of a tetravalent metal in an aqueous solution containing a tetravalent metal ion together with a divalent metal ion, and then producing a hydroxide of the divalent metal, or (ii) a technique which comprises previously preparing a phosphate of a tetravalent metal in an aqueous solution which does not contain a divalent metal ion, adding an aqueous solution containing such a divalent metal ion to the above reaction mixture to form a hydroxide of the divalent metal.

When a composition is prepared using an aqueous solution containing both of a tetravalent metal ion and a divalent metal ion according to the above technique (i), a precipitate of a phosphate of the tetravalent metal may be formed by adding a phosphoric acid or a phosphate to an aqueous solution comprising a tetravalent metal-containing compound and a divalent metal-containing compound while preventing or inhibiting formation of an insoluble hydroxide of the divalent metal with stirring. In this technique, pH of the aqueous solution containing the tetravalent metal-containing compound and the divalent metal-containing compound, is in an acidic region, for example about pH 0 to 6 (preferably about pH 0 to 4). Where necessary, the pH may be adjusted to an acidic region (e.g. about pH 4 or lower) by adding an acid to the aqueous solution before adding the phosphoric acid or phosphate for preventing the formation of a hydroxide of the divalent metal.

An adequate alkali (base) and/or acid can be used for adjustment of the pH of the aqueous solution. The alkali includes, for example, inorganic bases such as hydroxides of alkali metals or alkaline earth metals (e.g. sodium hydroxide, potassium hydroxide, calcium hydroxide, etc.) and ammonia, and organic bases such as trimethylamine, triethylamine, triethanolamine and so on. As the acid, there may be used, for instance, inorganic acids such as hydrochloric acid, nitric acid, sulfuric acid, etc., and organic acids such as acetic acid, trichloroacetic acid, trifluoroacetic acid, formic acid, oxalic acid and the like.

Examples of the phosphoric acid or phosphate used for preparation of the insoluble phosphate include orthophosphoric acid, metaphosphoric acid, pyrophosphoric acid, and alkali metal salts of these acids (e.g. sodium salts, potassium salts, etc.), as well as ammonium salts. In more concretely, the phosphate includes, for instance, sodium primary phosphate, sodium secondary phosphate, sodium tertiary phosphate [hereafter these salts may simply referred to as the sodium phosphates (primary, secondary and tertiary)], potassium phosphates (primary, secondary and tertiary), ammonium phosphates (primary, secondary and tertiary), sodium metaphosphate, potassium metaphosphate, sodium pyrophosphate, potassium pyrophosphate and so forth.

In the above technique (i), the produced phosphate of the tetravalent metal may practically be precipitated to a sufficient extent by aging (maturing) or other techniques. For such aging, conventional technologies can be employed such as a technique which comprises leaving the solution at room temperature over a long time, a technique comprising leaving the solution with heating at a temperature of not higher than 100° C. over a long period, a technique comprising heating it under reflux and so on.

After completion of aging, the hydroxide of the divalent metal can be formed by adding an alkali (base) to the reaction mixture to adjust the pH of the mixture to a neutral range such as pH 4 to 12. The hydroxide of the divalent metal may also be prepared by adding a base and a mixture containing the phosphate of the tetravalent metal and a divalent metal ion, which has been subjected to aging, concurrently to a liquid in a neutral range, for instance, in about pH 4 to 12. In the above-mentioned pH range, a precipitate comprising a hydroxide of the divalent metal is formed, and the formed precipitate of the hydroxide and the insoluble phosphate of the tetravalent metal are precipitated to form a precipitate (deposit) mixture or a coprecipitate mixture. When the reaction in the preparation of the hydroxide of the divalent metal proceeds so slowly at ambient temperature (room temperature), the reaction system may be heated. If necessary, the reaction may also be carried out at a temperature of 100° C. or higher under pressure. Further, the stirring of the reaction mixture can also be conducted by air-bubbling.

In the technique (ii), a precipitate of the phosphate of the tetravalent metal, and the hydroxide of the divalent metal can be prepared according to a manner similar to the technique (i). That is, a phosphate is previously prepared by adding a phosphoric acid or its salt to an aqueous solution which contains a tetravalent metal ion but does not contain a divalent metal ion. A precipitate mixture may also be obtained by, after aging the produced phosphate as necessary, adjusting, where necessary, the pH value to an acidic range (region), for example in pH 4 or lower, adding an aqueous solution containing a divalent metal ion (for example, an aqueous solution containing a metallic salt) to the reaction mixture and adjusting the pH to a neutral range, for example in pH 4 or higher in the same manner as above. According to this technique, the aging of the phosphate of the tetravalent metal may be completed in a comparatively short time.

The photocatalyst may be incorporated, for example in the form of a powder or granule, into a reaction system for formation of the phosphate of the tetravalent metal and the hydroxide of the divalent metal, or it may be added to the reaction mixture or the produced precipitate after completion of formation of the phosphate and/or the hydroxide.

Furthermore, the photocatalyst may also be formed simultaneously or concurrently with the formation of the phosphate of the tetravalent metal and/or the hydroxide of the divalent metal. The above-mentioned techniques (i) and (ii) can be utilized in the formation of such photocatalyst. Taking a titanium oxide as an example, such titanium oxide can be produced by adding a titanium halide such as a titanium chloride, an inorganic acid salt (e.g. a sulfate such as titanium sulfate) and/or an alkoxide, as necessary, to the reaction system and adjusting the pH of the reaction system to a neutral or alkalescent region, for instance in about pH 6 to 12.

For preparation of a composition containing a silicon dioxide, a silicon dioxide and/or a silicic acid ion species may be added at least in one step of the precipitate formation reaction, or a silicon dioxide may be mixed with the produced precipitate containing a photocatalyst component or others. In case the silicon dioxide is produced concurrently with the formation of the precipitate, a solution of an alkalescent silicate (e.g. sodium silicate, potassium silicate, etc.) can be used in lieu of the base. When use is made of the silicic acid ion species, a hydrated silicon dioxide can be formed in the reaction system by adjusting the pH to a neutral region, for example in about pH 4 to 12, accompanying with the formation of the hydroxide of the divalent metal.

Regarding the silver component, a deodorizable composition containing the silver component can be obtained by, in the similar manner to the silicon dioxide, adding a silver component such as an insoluble silver-containing compound and/or a silver ion species to the reaction system at least in one step of formation of the precipitate. Further, the silver component such as silver ion can easily be supported on at least one ingredient of the photocatalyst, phosphate, hydroxide and silicon dioxide according to a conventional technology such as ion-exchange method, impregnation or others.

Where necessary, thus-obtained precipitate may be purified in a conventional manner. By way of an example, a purified deodorizable component or deodorizable composition can be obtained by filtrating and separating the reaction mixture containing a precipitate such as the precipitate mixture, washing the residue (filter cake) with a washing solvent or washing agent such as warm water or water to remove impurities including, for example, an anion species of a metallic salt, and drying the resultant.

The filtration may be conducted, with the use of a filter paper, a filter cloth or other filtrating means, at ambient temperature and under atmospheric pressure, under a reduced pressure or under a pressure. For such filtration, centrifugal separation, vacuum filtration or other techniques can also be employed. Furthermore, decantation or other washing technique may be employed for the washing.

The drying can be carried out by a conventional technology, such as air-drying or drying under heating at a temperature lower than a decomposition temperature of the deodorizable composition, for instance not higher than about 400° C., and preferably not higher than about 200° C.

In the present invention, the deodorizable component or deodorizable composition (hereinafter they may briefly referred to as "deodorant") may only be incorporated or compounded into a fiber. As means to incorporate the deodorant into a fiber, there may be mentioned a process of spinning a composition containing the deodorant and a fiber-formable polymer (raw material for spinning), and a process of adhering the deodorant to the surface of a fiber with the use of a binder such as an adhesive resin for inhibiting the leaving out of the deodorant.

Especially, when a naturally-occurring fiber (cotton, hemp, wool, silk or other naturally-occurring fibers), in which the deodorant is hardly be contained, is chosen as the fiber to be incorporated with the deodorant, a technique which comprises adhering or attaching the deodorant to the surface of the fiber using a binder may advantageously be employed. As a technique for adhering the deodorant to the surface of the fiber, use can be made of conventional techniques such as a process of impregnating a fiber with a dispersion containing the deodorant where necessary together with a binder, or spraying or coating the dispersion to the fiber. Examples of the binder include a solvent-soluble polyolefin, a poly(vinyl acetate), an ethylene-vinyl acetate copolymer, a poly(vinyl chloride) and other vinyl polymers, acrylic resins, styrenic resins, polyesters, polyamides, polyurethanes and other thermoplastic resins; cellulosic resins; epoxy resins, vinyl ester resins, silicone resins and other thermosetting resins.

When a synthetic fiber, a semi-synthetic fiber or a regenerated fiber is chosen as the fiber to be incorporated with the deodorant, a fiber containing the deodorant therein can be obtained by adding the deodorant to a spinning solution comprising a fiber-formable polymer, and spinning the resultant spinning dope according to a conventional spinning technique. Such spinning technique can be selected, depending on the species of the polymer, from wet-spinning, dry-spinning, wet-dry spinning, melt-spinning and other known technologies. The deodorant may also be adhered, with the use of a binder, to the surface of a synthetic, semi-synthetic or regenerated fiber without adding the deodorant to the spinning solution.

In particular, when the fiber to be incorporated with the deodorant is a synthetic, semi-synthetic or regenerated fiber, a technique which comprises adding the deodorant to a spinning solution comprising a fiber-formable polymer can advantageously be employed so that the deodorant is firmly supported inside of the fiber and hence is hardly left out from the fiber, and hence the deodorant activity can stably be exhibited over a prolonged period of time. Further, when a binder is used in an after-processing step, the touch or feel of the resultant fibrous article may occasionally become hard so that the value as goods (product) may be sacrificed. Therefore, the deodorant may preferably be incorporated into the fiber by an internal-adding method.

The deodorizable fiber obtained by spinning may be, for instance, a fiber containing the deodorant homogeneously throughout the fiber, or may be a composite (compounded) fiber having a complex or composite structure composed of a phase containing the deodorizable component in a high concentration and a phase in which the concentration of the deodorizable component is lower than that of the above high-concentration phase. This composite fiber may have, for example, at least one of the following composite structures; (1) a composite structure in which the content of the deodorant (distribution) varies between a central (core) portion and a surface portion (surface layer) (e.g. a sheath-core structure in which one of the core and the sheath of a sheath-core-composite fiber contains the deodorant, or the content of the deodorant is different between the core and the sheath), (2) a composite structure in which the deodorant is distributed in sea-island form in the fiber (e.g. a sea-island or matrix structure in which one of the sea or the island of a sea-island composite fiber contains the deodorant, or the content of the deodorant varies between the sea and the island), (3) a composite structure in which the deodorant is distributed in a side-by-side form in the fiber (e.g. a side-by-side structure in which one phase of a side-by-side composite fiber contains the deodorant, or the content of the deodorant is different between the one phase and the other phase), (4) a composite fiber having a kidney-shaped structure, (5) a composite structure in which the deodorant is contained at random in terms of a cross section of the fiber, and other composite structures. In the side-by-side composite fiber, a phase containing the deodorant in a high concentration and a phase in which the deodorant concentration is comparatively lower than the high-concentration phase may be, if necessary through a resin phase optionally containing the deodorant, adjacent to each other in an optional direction such as a parallel direction or circumferential direction. The side-by-side composite fiber may comprise a plurality of high-concentration phases and/or low-concentration phases. Preferred composite fiber (complex fiber) may have a sheath-core structure, a sea-island structure or a side-by-side structure, in particular, a sheath-core structure or a side-by-side structure.

The cross sectional configuration of the deodorizable fiber of the present invention is not limited, and may be a round cross section, as well as a modified cross section (e.g. hollow, flat, elliptical, polygonal shape (e.g. a polygon having 3 to 6 angles), a leaf-shape having 3 to 14 leaves, T-shape, H-shape, V-shape, dog-bone shape (I-shape)) or other shapes. For enhancing the deodorant capability of the fiber, a fiber of a modified or irregular cross section having a high specific surface area can advantageously be employed.

Further, the deodorizable fiber may be a fiber having a combination of the composite structure and the cross sectional configuration, for example a hollow fiber having a sheath-core structure or a side-by-side structure.

In the deodorizable fiber having a composite structure, in order to eliminate malodorous components with high efficiency by means of the deodorant in the surface layer of the fiber even when the amount of the deodorant relative to the fiber is small, it is advantageous that a phase containing the deodorant is exposed to the surface of the fiber. Taking a deodorizable fiber having a sheath-core structure as an example, when the deodorant is contained in the sheath in a higher concentration than that of the core (specifically, when the deodorant is contained in the sheath), malodorous components can efficiently be eliminated by means of the deodorant present in the surface layer of the fiber. Further, as to a deodorizable fiber having a side-by-side structure, the content of the deodorant in a suitable phase exposed on the surface of the fiber may be increased. A composite fiber such as a sheath-core composite fiber composed of a high-concentration phase and a low-concentration phase in which the content of the deodorant varies from each other is preferably employed, because the amount of the deodorant based on the total amount of the fiber can be decreased, according to the ratio of the high-concentration phase (a ratio of the sheath based on the total of the fiber in the sheath-core composite fiber), to such an extent as to be about 0.01 to 20% by weight, preferably about 0.1 to 15% by weight, more preferably about 0.5 to 10% by weight (e.g. about 1 to 5% by weight).

The proportion of the low-concentration phase (the core in a sheath-core composite fiber) relative to the high-concentration phase (the sheath in such sheath-core composite fiber) is such that the low-concentration phase (core) /the high-concentration phase (sheath) is about 5/95 to 95/5 (by weight), preferably about 10/90 to 90/10 (by weight), and more preferably about 30/70 to 70/30 (by weight).

The species of the polymer which constitutes the composite fiber is not particularly restricted, and the polymer for the low-concentration phase (core) and the polymer for the high-concentration phase (sheath) may be whichever of the same or different species. Preferred combination of such polymers includes, for example, a combination of a polyester for the low-concentration phase (core) and a polyamide or a polyester for the high-concentration phase (sheath).

In production of a fiber containing the deodorant inside thereof, the time (step) and embodiment for addition of the deodorant are not strictly limited. Such fiber may be produced by employing, for example, the following adding technologies;

(1) a process of adding the deodorant in a polymerizing step of the fiber-formable polymer, or immediately after such polymerizing step, (2) a process of adding the deodorant to the fiber-formable polymer to prepare a masterbatch and forming the fiber using the masterbatch, or (3) a process of adding the deodorant to the fiber-formable polymer in any optional step of the production process until the polymer is spun out from a spinning nozzle (mouthpiece) (e.g. a step of preparing a pellet of the fiber-formable polymer, a step of spinning, etc.).

When the fiber is produced according to the above-mentioned process (1), the process can be carried out by, in more detail, a manner of adding the deodorant to a material slurry for the fiber-formable polymer, a manner of previously preparing a prepolymer and adding the deodorant thereto immediately before polycondensation of the prepolymer, a manner of adding the deodorant to the fiber-formable polymer immediately after the preparation of the polymer during the polymer is still in a liquid state. The deodorant used in the present invention has a high catalytic activity so that it may occasionally affect on the polymerization depending on the species of the polymer, and a care is required in such a case. The process (2) or (3) may preferably be employed for addition of the deodorant.

Further, the deodorant may practically be added in the form of a powder (e.g. a fine particle), but when a powdery deodorant, as such, is added to the polymer, coagulation of particles may occur so that fiber-formation may be rendered to be difficult or even though a fiber would be formed, only a fiber having a weak strength would be obtained. Therefore, the deodorant may also be added in the form of a slurry obtainable by dispersing the powdery deodorant into a suitable dispersion medium.

Incidentally, the composite fiber can be manufactured according to a conventional technology, such as a process which comprises spinning a first resin composition comprising a fiber-formable polymer as a main component, and a second resin composition comprising the deodorant and a fiber-formable polymer as main components to form a high-concentration phase and a low-concentration phase.

The fiber diameter in the deodorizable fiber and fibrous article according to the present invention is not specifically limited, and may be selected from a wide range according to the use of the product. The fiber diameter is, for example, about 0.1 to 50 μm, preferably about 0.5 to 30 μm and more preferably about 1 to 20 μm. Further, the configuration of the fiber in the longitudinal direction is also not particularly limited, and the fiber may be any of fibers such as a fiber having nearly same diameter in the longitudinal direction, a thick-and-thin fiber having a thick portion and a thin portion in the longitudinal direction or other fiber having other configuration. Further, the fiber may be whichever of a short staple or a long fiber (filament). When the fibrous article is a yarn or thread, it may be whichever species of yarns such as a spun yarn, a multi-filament yarn, a composite yarn comprising a short staple and a long fiber or others.

Furthermore, according to the use and species of the fiber, the fiber of the present invention may be treated by any processing technology such as false-twisting, interlacing, Taslan-processing (bulking processing), crimping, marcerization, shrink proofing, crease proofing, hydrophilization, water proofing, resist styling (resist printing) and other processes.

The deodorizable fiber of the present invention may further comprise, according to the species of the fiber, various conventional additives used for a fiber, in addition to the deodorant. As such additives, there may be mentioned for instance antioxidants, flame-retardants, antistatic agents, colorants (coloring agents), lubricants, antimicrobes, moth-proofing and tick-proofing agents, mildew-proofing agents, ultraviolet ray adsorbents, delustering agents (flatting agents), heat reserving agents and others.

The deodorizable fiber of the present invention can be used for various fibrous article applications. Typical examples of the fibrous articles include yarns; clothes or fabrics such as woven fabrics, knitted fabrics and non-woven fabrics; pile fabrics such as pile woven fabrics and pile knitted fabrics; clothing and other wearing goods made of the yarns, fabrics, pile fabrics or others; products for the interior applications; beddings; packaging materials for foods and so forth. More concretely, as practical examples of the fibrous article according to the present invention which is formed with the use of a fiber, yarn or fabric incorporated with the deodorant, there may be mentioned clothes and other wearing goods such as underwear or underclothes, sweaters, jackets or pullovers, pajamas, bath dresses, white robes, slacks or trousers, socks, gloves or mittens, stockings, aprons, masks, towels, handkerchiefs, supporters, head bands, hats or caps, insoles for shoes, interlining clothes and padding clothes; various carpets, curtains, wall papers, sash papers, sliding doors, blind slats made of fiber, artificial foliage plants, clothes for clothing chair or other application, tablecloths, covers for electrical articles, mats, padding materials for bedclothes (e.g. padding cotton), side clothes for bedclothes, sheets, blankets, covers for bedclothes, pillows, covers for pillows, covers for bed, padding materials for bed, mats, medical supplies, covers for toilet seats, wiping cloths, filters for air purification equipments or air conditioners.

The deodorizable fiber and the fibrous article as produced using the fiber of the present invention insure rapid decomposition and deodorization of ammonia, amines and other basic malodorous components, acetic acid and 5 other acidic malodorous components, hydrogen sulfide and other sulfur-containing compounds, formalin, acetaldehyde and other neutral malodorous components for a long period of time under light irradiations (e.g. solar light, fluorescent lamp, ultraviolet lamp, etc.). Accordingly, they provide efficient elimination even if applied to tobacco smell containing a large number of malodorous components, and hence thy are useful for deodorization in a room or in a car or carriage. Further, the fiber and fibrous article are also effectively used for deodorization of formalin, acetaldehyde and other aldehydes derived from a furniture or new building material.

Further, the deodorant fiber and the fibrous article insure adsorption of acidic malodorous components and basic malodorous components and hence efficient deodorization of these malodorous components even without light irradiations. Further, under light irradiations such as solar light, fluorescent lamp and ultraviolet ray (UV) lamp, they provide further enhanced deodorizing capabilities not only for the acidic malodorous components and basic malodorous components but also for neutral malodorous components such as aldehydes, and further, they insure prolonged maintaining of such deodorizing effects over a long period. Such deodorizing capabilities are due to synergistic effects of oxidative decomposition activity of the photocatalyst and the high adsorbing activity of the adsorbent. Moreover, even when an oxidative decomposed product formed by the activity of the photocatalyst (for example, acetic acid is produced from acetaldehyde) is eliminated or discharged partially so as to cause a new malodorous problem, such oxidative decomposed product can be adsorbed by using the adsorbent in combination with the photocatalyst. Therefore, the fiber and fibrous article insure inhibition of elimination or discharging of the oxidization-decomposed product and hence further improved deodorizing efficiency, and the deodorizing effects can be maintained for a long time since the substance adsorbed by the adsorbent is further decomposed by the photocatalyst.

In the light irradiations, a ray having a suitable wavelength corresponding to the photocatalyst can be used. The wavelength of the ray may be any of wavelengths only if it excites the photocatalyst, but the ray may practically be an ultraviolet radiation, or a radiation containing an ultraviolet ray. When a titanium oxide is chosen as the photocatalyst, a light derived from sunshine or a fluorescent lamp may be sufficient for an effective exhibition of the catalytic activities. The light irradiation may usually be conducted in the presence of an oxygen-containing gas such as oxygen gas or air.

The deodorizable fiber of the present invention comprises the deodorizable composition comprising the photocatalyst, the phosphate of the tetravalent metal and the hydroxide of the divalent metal so that various malodorous or harmful components (acidic, basic and neutral malodorous components) can be eliminated with high efficiency over a long time. Especially, the fiber shows high elimination capability for neutral malodorous components which are hardly eliminated by adsorption mechanism, in addition to acidic and basic malodorous components. Further, since a combination of the photocatalyst and the adsorbent is incorporated, the fiber can efficiently eliminate malodorous components regardless of the pressure or absence of light irradiations. The fibrous article according to the present invention is formed of the deodorizable fiber so that it has such excellent characteristics as above.

According to the method of the present invention, a deodorizable fiber having such excellent characteristics as above can be produced by such a simple manner of incorporating the deodorizable component into a fiber.

The following examples are intended to illustrate the present invention in more detail, but should by no means limit the scope of the invention.

EXAMPLES

Example 1

<Preparation of a deodorizable composition>

[$Cu(II)$-$Ti(IV)$-$SiO_2$-$TiO_2$ composition]

To 1 liter of distilled water was added 43.9 g of a crystal of a copper sulfate ($CuSO_4 \cdot 5H_2O$, guaranteed (special grade) reagent manufactured by Wako Pure Chemical Industries, Ltd., Japan), and the resultant solution was added with 60 g of an aqueous solution of a titanium sulfate (concentration about 30% by weight, reagent manufactured by Wako Pure Chemical Industries, Ltd., Japan) to give a mixture containing 0.175 mole of $Cu(II)$ ions and 0.075 mole of $Ti(IV)$ ions. The pH of the mixture was approximately 1. While being stirred at room temperature, the mixture was added dropwise with about 110 g of a solution containing 15% by weight of a phosphoric acid to give a white precipitate. The resultant mixture containing the precipitate was further stirred for one day.

While respectively stirring in different beakers, the above mixture containing the precipitate (Mixture A) and 471 g of an aqueous solution containing sodium silicate (Mixture B) were added dropwise, side-by-side, to 500 ml of distilled water in a vessel to form a precipitate mixture of pale color containing $Cu(II)$-$Ti(IV)$-$SiO_2$. The amounts of the dropwise-added Mixtures A and B were adjusted to such amounts as to maintain the resultant mixture being at about pH 7.0. While, Mixture B had been prepared by diluting an aqueous solution of sodium silicate (reagent manufactured by Wako Pure Chemical Industries, Ltd., Japan) with distilled water to contain 30% by weight of sodium silicate (0.86 mole as $SiO_2$) and adding 30 ml of an aqueous solution containing 15% by weight of sodium hydroxide to the diluted solution.

The resultant mixture comprising Mixture A and Mixture B was stirred at room temperature for successive 2 hours, and the pale-colored precipitate was separated by filtration under a reduced pressure, and was thoroughly washed with a warm deionized water and dried at 40° C. The dried material was pulverized or divided in a mortar into a powder with a diameter of not more than 120 μm to give a pale powder containing $Cu(II)$-$Ti(IV)$-$SiO_2$.

To 80 parts by weight of the above pale-colored powder was added 20 parts by weight of a powdery titanium oxide (Ishihara Sangyo Kaisha, Ltd., Japan, MC-90), and the resultant mixture is pulverized with a jet mill to provide a deodorizable composition.

<Manufacture of a fiber>

To nylon 6 was added 20% by weight of the above-obtained deodorizable composition and mixed at a temperature of 260° C. for 20 minutes. The resultant mixture was extruded using an extruder while kneading to prepare pellets for masterbatch. The nylon 6 (3 parts by weight) was added to 1 part by weight of the pellets to give a resin composition for the sheath.

On the other hand, an esterification reaction vessel was charged with 100 parts by weight of terephthalic acid, 60 parts by weight of ethylene glycol, 0.04 part by weight of antimony trioxide and 2 parts by weight of a titanium dioxide having a mean particle size of 0.5 μm, and esterification was conducted while gradually elevating the temperature from 160° C. up to 240° C. Thereafter, the reaction mixture was subjected to polycondensation in a polycondensation reaction vessel by elevating the temperature up to 280° C. under reduced pressure to give a polyester with a limiting viscosity of 0.75. This polyester was used as a polymer for the core.

The resin composition for the sheath and the polymer for the core were spun at a spinning temperature of 280° C. and a spinning rate of 1,000 m per minute, extended and false-twisted to give a deodorizable sheath-core composite filament yarn (150 deniers, 32 filaments). This filament yarn was woven to provide a fabric. The relative ratio of the core to the sheath in the fiber having a core-sheath structure was such that the core: the sheath=50:50 (by weight).

Example 2

The procedure of Example 1 was repeated except that 50 parts by weight of the titanium oxide powder used in Example 1 was mixed with 50 parts by weight of the pale-colored powder containing $Cu(II)$-$Ti(IV)$-$SiO_2$ obtained in Example 1 to prepare a deodorizable composition, and by using this composition, fiber-forming and weaving were conducted in the same manner as Example 1 to give a fabric.

Example 3

<Preparation of a deodorizable composition>

[$Zn(II)$-$Ti(IV)$-$TiO_2$ composition]

To 1 liter of distilled water was added 60.0 g of a titanium sulfate solution (concentration about 30% by weight, reagent manufactured by Wako Pure Chemical Industries, Ltd., Japan) to give a mixture containing 0.075 mole of $Ti(IV)$ ions. A solution (about 98 g) containing 15% by weight of a phosphoric acid was added to the above mixture with stirring at room temperature to give a white precipitate. The resultant mixture containing the white precipitate was stirred for 2 hours.

To this mixture containing the white precipitate was added 50.3 g of a crystal of a zinc sulfate ($ZnSO_4 \cdot 7H_2O$, guaranteed (special grade) reagent manufactured by Wako Pure Chemical Industries, Ltd., Japan) to give a solution containing 0.175 mole of $Zn(II)$ ions.

To the obtained solution was added dropwise, with stirring at room temperature, a 15% sodium hydroxide solution to such an extent as to give a mixture with a pH of 7.0. When the pH of the resultant mixture was decreased even with adding the sodium hydroxide, the sodium hydroxide solution was further added to the mixture for maintaining the pH of the resultant mixture being in about 7.0. As a result of stirring to such an extent as not to observe the decrease of the pH, a white mixture of precipitates containing $Zn(II)$-$Ti(IV)$ was formed (Mixture A).

Thirty seven (37) grams of titanium tetrachloride 10 (guaranteed (special grade) reagent manufactured by Wako Pure Chemical Industries, Ltd., Japan) was added drop wise to the Mixture A, while adding dropwise an aqueous solution containing 15% by weight of sodium hydroxide to the mixture in such an amount as to give a pH of 7.0 to provide a precipitate of a titanium oxide.

The formed precipitate was separated by filtration under a reduced pressure, washed fully with a warm deionized water, and dried at 110° C. The dried product was pulverized in a mortar to such an extent as to have a particle size of not exceeding 120 μm and further pulverized with the use of a jet mill to afford a white powder of a deodorizable composition containing $Zn(II)$-$Ti(IV)$-$TiO_2$.

<Manufacture of a fiber>

A fabric was obtained by fiber-forming and weaving in the same manner as Example 1 except that 30% by weight of the deodorizable composition obtained above was added to the nylon 6 used in Example 1 to prepare a pellet for masterbatch and that the ratio of core/sheath in the fiber-formation was 70/30 (by weight).

Example 4

<Preparation of a deodorizable composition>

[$Zn(II)$-$Ti(IV)$-$TiO_2$ composition]

To 180 g of water were added 6.64 g of a powdery titanyl sulfate (Fuji Titanium Industries, Ltd., Japan; trade name: Taisult, titanium content as $TiO_2$ of 32.5% by weight) and 18.1 g of a zinc sulfate crystal ($ZnSO_4 \cdot 7H_2O$, guaranteed (special grade) reagent of Wako Pure Chemical Industries, Ltd., Japan) to give an aqueous solution containing 0.027 mole of $Ti(IV)$ ions and 0.062 mole of $Zn(II)$ ions. To the resultant aqueous solution was added dropwise about 35.3 g of an aqueous solution containing 15% by weight of a phosphoric acid with stirring at room temperature to form a white precipitate. The mixture containing the formed white precipitate was further stirred overnight.

To the obtained mixture was added dropwise 15% sodium hydroxide solution in such a proportion as to give a mixture with a pH of 7.0. In case that the pH of the resultant mixture was decreased in such addition of the sodium hydroxide, the sodium hydroxide solution was further added to the mixture to retain the pH of the mixture being in about 7.0. By stirring the mixture to such an extent as not to observe pH decrease, a white precipitate containing $Zn(II)$-$Ti(IV)$ was formed.

This white precipitate was filtrated and separated under a reduced pressure, washed thoroughly with a warm deionized water, dried at 120° C. and pulverized in a 5 mortar to give a white powder containing $Zn(II)$-$Ti(IV)$ with a diameter of not larger than 120 μm.

Thirty (30) parts by weight of a powdery titanium oxide (Ishihara Sangyo Kaisha, Ltd., Japan, MC-90) was added to 70 parts by weight of the white powder containing $Zn(II)$-$Ti(IV)$. The resulting mixture was pulverized in a Jet-mill pulverizer to give a finely divided powder of a deodorizable composition comprising $Zn(II)$-$Ti(IV)$-$TiO_2$ with a mean particle size of 1 μm.

<Manufacture of a fiber>

A fabric was obtained by fiber-forming and weaving in the same manner as Example 1 except that 30% by weight of the above deodorizable composition was added to the nylon 6 employed in Example 1 and that the ratio of core/sheath in the fiber-formation was 50/50 (by weight).

Example 5

In this example, a deodorizable composition obtained in the same manner as Example 4 except for the drying temperature being set at 320° C., and a polyester with a limiting viscosity [η]=0.75 obtained by the same manner as Example 1 except for adding the titanium dioxide in an amount of 0.5% by weight in the preparation of the polyester were used. That is, 5% by weight of the deodorizable composition was added to the polyester and the resultant mixture was molten and kneaded at 285° C., and melt-extruded from a modified-shaped nozzle with a cross-shape. The extrudate was extended, crimped and cut into a length of 51 mm to give a short staple having a fiber fineness of 2 deniers.

By using this short staple, a spun yarn was manufactured, and this spun yarn was woven to give a fabric.

Comparative Example 1

A fabric was manufactured using nylon 6 fiber (150 deniers, 32 filaments) without employing the photocatalyst and adsorbent.

Comparative Example 2

Fiber-formation and weaving were conducted in the same manner as Example 1 except that a pellet for master batch containing 20% by weight of a titanium oxide powder (Ishihara Sangyo Kaisha, Ltd., Japan; MC90) was employed to provide a fabric.

Comparative Example 3

A fabric was manufactured in the same fiber-forming and weaving manner as Example 1 except by using a pellet for masterbatch containing 20% by weight of a coprecipitate composition comprising titanium phosphate and zinc hydroxide in such a ratio that Ti ion:Zn ion=0.3 mole:0.7 mole.

Deodorization test

The removing capabilities for malodorous components of the fabrics each obtained in examples, and comparative examples were evaluated regarding hydrogen sulfide, ammonia and acetaldehyde, respectively in the following manner.

That is, 3 g of the fabric was disposed in a 5-liter Tedlar bag and was sealed. By using a syringe, an air containing a predetermined malodorous component was injected into the Tedlar-bag in an amount of 3 liters as the total gas amount. The initial concentrations of ammonia, acetaldehyde and hydrogen sulfide in the injected gas were 40 ppm, 50 ppm and 15 ppm, respectively.

The test was carried out under dark condition and under light irradiations, respectively. In a dark-conditioned test, the Tedlar-bag was disposed on standing in a dark room, and in a test under light irradiations, the whole of the fabric was irradiated while the Tedlar-bag was allowed to stand at a distance of 15 cm from a 27 W-white fluorescent lamp.

Regarding hydrogen sulfide and acetaldehyde, a gas was sampled from the Tedlar-bag with the use of a microsyringe after a certain time elapsed from the gas injection, and the gas content was determined with a gas chromatography (Shimadzu Corporation, Japan; Type GC-14A) to give an elimination ratio of the malodorous component. With respect to ammonia, the gas content in the Tedlar-bag was determined directly using a gas detector (Gastec Co., Ltd., Type 3L for ammonia). Elimination ratios of each malodorous components were determined according to the following equation. The results are set forth in Tables 1, 2 and 3.

Elimination ratio (%)=$(C_0-C)/C_0 \times 100$ wherein $C_0$ represents an initial concentration and C represents a concentration after a predetermined time elapsed.

TABLE 1

Elimination ratio of ammonia (%)

| Time elapse | Dark condition | | Light irradiation | |
|---|---|---|---|---|
| | 2 hr | 5 hr | 2 hr | 5 hr |
| Example 1 | 61 | 68 | 65 | 70 |
| Example 2 | 70 | 79 | 73 | 80 |
| Example 3 | 72 | 83 | 76 | 87 |
| Example 4 | 80 | 92 | 85 | 95 |
| Example 5 | 58 | 70 | 60 | 72 |
| Comp. Ex. 1 | 9 | 15 | 8 | 15 |
| Comp. Ex. 2 | 40 | 46 | 49 | 58 |
| Comp. Ex. 3 | 60 | 67 | 60 | 65 |

TABLE 2

Elimination ratio of hydrogen sulfide (%)

| Time elapse | Dark condition | | Light irradiation | |
|---|---|---|---|---|
| | 2 hr | 5 hr | 2 hr | 5 hr |
| Example 1 | 65 | 71 | 65 | 72 |
| Example 2 | 49 | 65 | 51 | 70 |
| Example 3 | 65 | 73 | 69 | 75 |
| Example 4 | 70 | 79 | 72 | 81 |
| Example 5 | 41 | 65 | 42 | 65 |
| Comp. Ex. 1 | 1 | 2 | 1 | 2 |
| Comp. Ex. 2 | 3 | 5 | 5 | 8 |
| Comp. Ex. 3 | 60 | 71 | 61 | 71 |

TABLE 3

Elimination ratio of acetaldehyde (%)

| Time elapse | Dark condition | | Light irradiation | |
|---|---|---|---|---|
| | 5 hr | 24 hr | 5 hr | 24 hr |
| Example 1 | 14 | 19 | 21 | 52 |
| Example 2 | 13 | 15 | 45 | 72 |
| Example 3 | 18 | 24 | 35 | 60 |
| Example 4 | 15 | 20 | 46 | 76 |
| Example 5 | 12 | 15 | 40 | 71 |
| Comp. Ex. 1 | 7 | 10 | 7 | 11 |
| Comp. Ex. 2 | 10 | 13 | 41* | 70* |
| Comp. Ex. 3 | 13 | 18 | 14 | 18 |

*A gas after completion of the test smelled of an offensive odor considered to be derived from a decomposed product.

As apparent from the tables, use of the deodorizable compositions each obtained in examples result in elimination of basic malodorous components and acidic malodorous components even in a dark-condition, and result in efficient elimination of neutral malodorous components by light irradiations. In Comparative Example 2, a gas after completion of the test smelled an offensive odor considered to be derived from a decomposed product.

What is claimed is:

1. A deodorizable fiber comprising a phosphate of a tetravalent metal, a hydroxide of a divalent metal and a photocatalyst which acts as a photooxidizing catalyst by producing an active oxygen on exposure to light irradiation.

2. The deodorizable fiber as claimed in claim 1, wherein said photocatalyst is a photo-semiconductor.

3. The deodorizable fiber as claimed in claim 1, wherein said photocatalyst is an oxide-semiconductor.

4. The deodorizable fiber as claimed in claim 1, wherein said photocatalyst is a titanium oxide.

5. The deodorizable fiber as claimed in claim 1, wherein the fiber contains 0.1 to 25% by weight of the photocatalyst based on the total weight of the fiber.

6. The deodorizable fiber as claimed in claim 1, wherein the proportion of the total amount of the phosphate of the tetravalent metal and the hydroxide of the divalent metal is 0.1 to 25% by weight based on the total amount of the fiber.

7. The deodorizable fiber as claimed in claim 1, wherein the proportion of the photocatalyst is 10 to 750 parts by weight relative to 100 parts by weight of the total amount of the phosphate of the tetravalent metal and the hydroxide of the divalent metal.

8. The deodorizable fiber as claimed in claim 1, wherein the fiber has a composite structure comprising a phase containing a deodorizable component comprising the photocatalyst, the phosphate of the tetravalent metal and the hydroxide of the divalent metal in a high concentration and another phase containing said deodorizable component in a lower concentration than that of said high-concentration phase.

9. The deodorizable fiber as claimed in claim 1, wherein the fiber has at least one composite structure selected from the group consisting of a sheath-core structure, a side-by-side structure and a sea-island structure.

10. The deodorizable fiber as claimed in claim 1, wherein said fiber has a modified cross section.

11. The deodorizable fiber as claimed in claim 1, wherein the cross section of said fiber is at least one configuration selected from the group consisting of hollow, flat, elliptical, polygonal, a leaf-form having 3 to 14 leaves, T-shape, H-shape, V-shape and dog-bone shape.

12. The deodorizable fiber as claimed in claim 1, wherein the fiber has a composite structure, and a phase comprising the phosphate of the tetravalent metal, the hydroxide of the divalent metal and the photocatalyst is exposed to the surface of the fiber.

13. The deodorizable fiber as claimed in claim 1, wherein the fiber has a sheath-core structure and the concentration of a deodorizable component comprising the phosphate of the tetravalent metal, the hydroxide of the divalent metal and the photocatalyst in the sheath is higher than that of the core.

14. A fibrous article which is formed with the deodorizable fiber of claim 1.

15. A method of producing a deodorizable fiber which comprises incorporating a phosphate of a tetravalent metal, a hydroxide of a divalent metal and a photocatalyst into a fiber.

16. The method of producing a deodorizable fiber according to claim 15, wherein a composition comprising the phosphate of the tetravalent metal, the hydroxide of the divalent metal, the photocatalyst and a fiber-formable resin is spun.

17. A deodorizing method which comprises bringing a malodorous component into contact with a deodorizable fiber comprising a phosphate of a tetravalent metal, a hydroxide of a divalent metal and a photocatalyst.

18. The deodorizing method according to claim 17, wherein said malodorous component is brought into contact with said deodorizable fiber under light irradiations.

19. The deodorizing method according to claim 18, wherein the light irradiation is conducted in the presence of an oxygen-containing gas.

* * * * *

UNITED STATES PATENT AND TRADEMARK OFFICE
CERTIFICATE OF CORRECTION

PATENT NO. : 5690922
DATED : 11/25/97
INVENTOR(S) : Motoya MOURI et al.

It is certified that error appears in the above-indentified patent and that said Letters Patent is hereby corrected as shown below:

On the cover page, in the section [73] add a second Assignee to read --Kuraray Co., Ltd.--.

Signed and Sealed this

Twenty-ninth Day of May, 2001

Attest:

NICHOLAS P. GODICI

*Attesting Officer*  *Acting Director of the United States Patent and Trademark Office*